United States Patent
Singh

(10) Patent No.: US 7,096,600 B2
(45) Date of Patent: Aug. 29, 2006

(54) FORCED GAS FLOW CANISTER DEHYDRATION

(75) Inventor: Krishna Singh, Palm Harbor, FL (US)

(73) Assignee: Holtec International, Inc., Marlton, NJ (US)

( * ) Notice: Subject to any disclaimer, the term of this patent is extended or adjusted under 35 U.S.C. 154(b) by 763 days.

(21) Appl. No.: 10/318,657

(22) Filed: Dec. 13, 2002

(65) Prior Publication Data
US 2005/0066541 A1 Mar. 31, 2005

(51) Int. Cl.
*F26B 3/00* (2006.01)
(52) U.S. Cl. ..................................................... 34/494
(58) Field of Classification Search .................. 34/380, 34/381, 494
See application file for complete search history.

(56) References Cited

U.S. PATENT DOCUMENTS

| | | | |
|---|---|---|---|
| 3,010,889 A | * | 11/1961 | Fortescue et al. ........... 376/253 |
| 4,828,760 A | | 5/1989 | Chung et al. |
| 5,453,562 A | * | 9/1995 | Swanstrom et al. ........... 588/1 |
| 6,372,157 B1 | | 4/2002 | Krill et al. |
| 6,684,526 B1 | * | 2/2004 | Tully ........................... 34/409 |

FOREIGN PATENT DOCUMENTS

EP 1 429 344 * 6/2004

* cited by examiner

*Primary Examiner*—S. Gravini
(74) *Attorney, Agent, or Firm*—Brian L. Belles; Wolf, Block, Schorr & Solis-Cohen

(57) ABSTRACT

The present invention provides a method and system for ensuring that cavities used to store radioactive elements are adequately dried without intrusive measuring. In one aspect the invention is a method of drying a cavity loaded with radioactive elements, the loaded cavity having a free volume ($V_F$), a starting vapor pressure ($vP_S$), and a cavity pressure ($P_C$), the method comprising: determining a desired degree of dryness in the cavity in terms of a desired vapor pressure ($vP_D$); cooling a non-reactive gas to a temperature ($T_C$) thereby drying the non-reactive gas; introducing the dry non-reactive gas into the cavity so that the free volume $V_F$ of the cavity turns over X times; and removing wet non-reactive gas from the cavity; wherein $T_C$ and X are controlled to achieve the desired vapor pressure ($vP_D$) in the cavity. Alternatively, a flow rate (R) can be controlled over time (t) instead of controlling X.

26 Claims, 9 Drawing Sheets

FORCED HELIUM DRYING THERMODYNAMIC CYCLE

FIGURE 4: FORCED HELIUM DRYING THERMODYNAMIC CYCLE

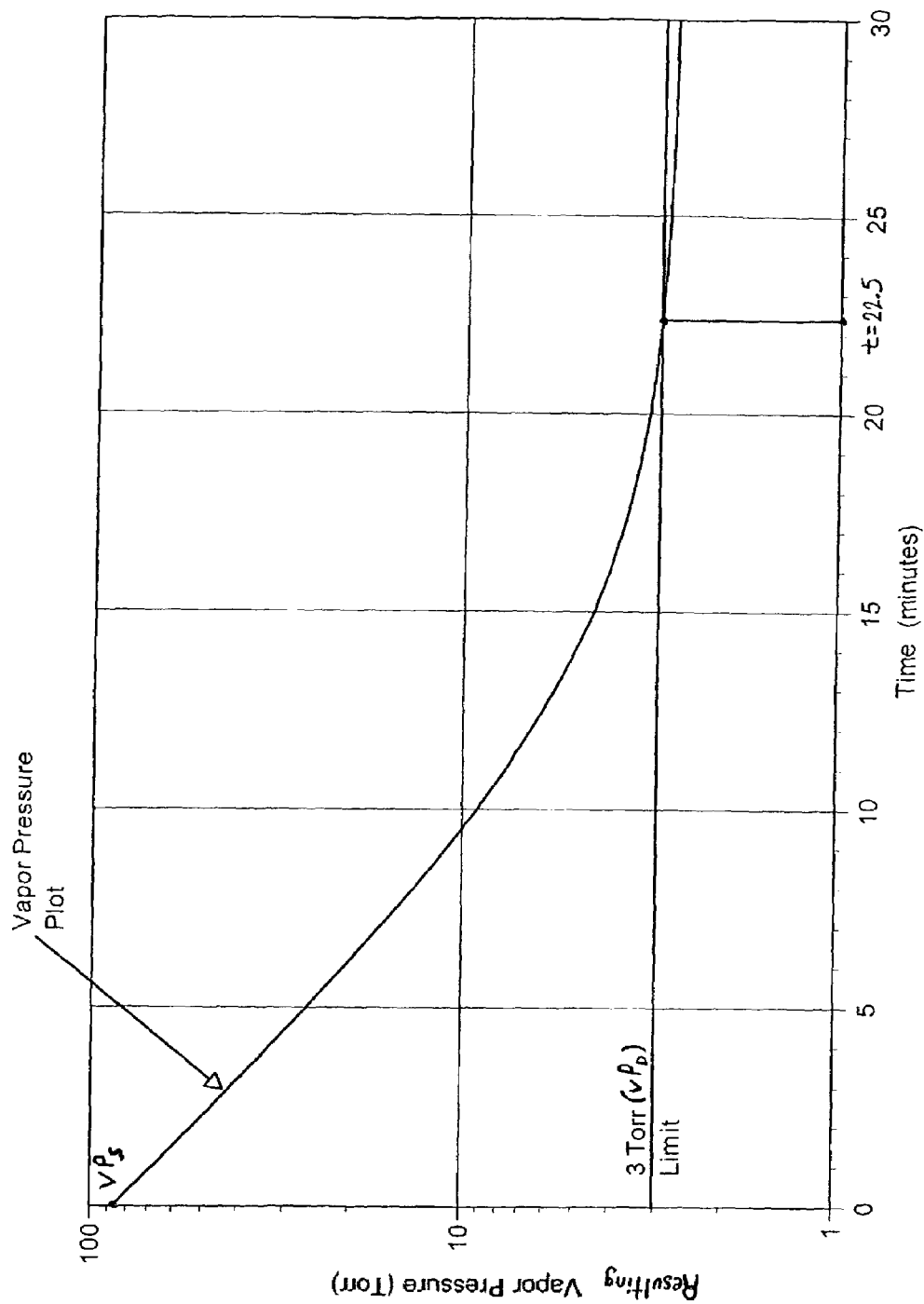
FIGURE 7: CANISTER GAS VAPOR PRESSURE ATTENUATION GRAPH

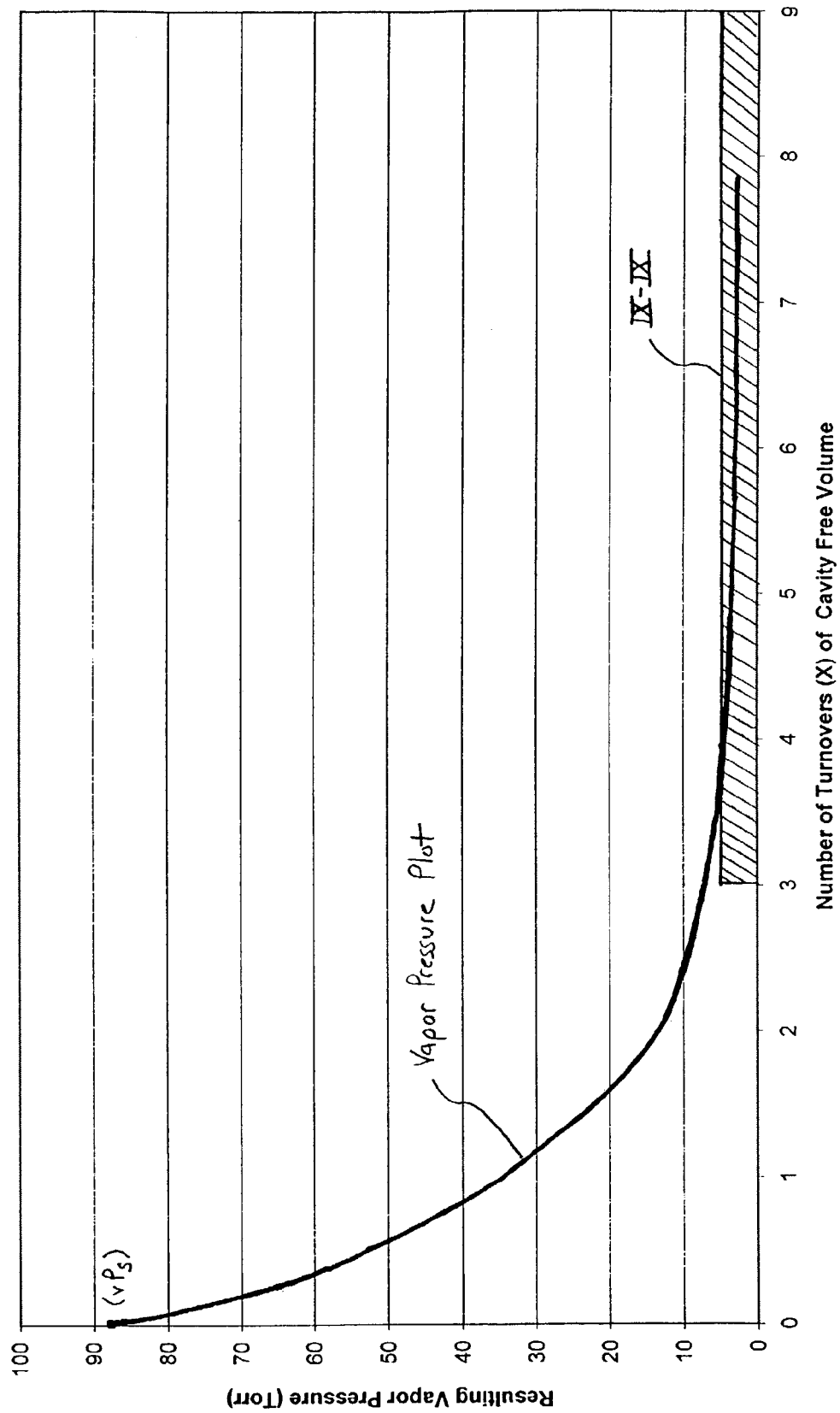

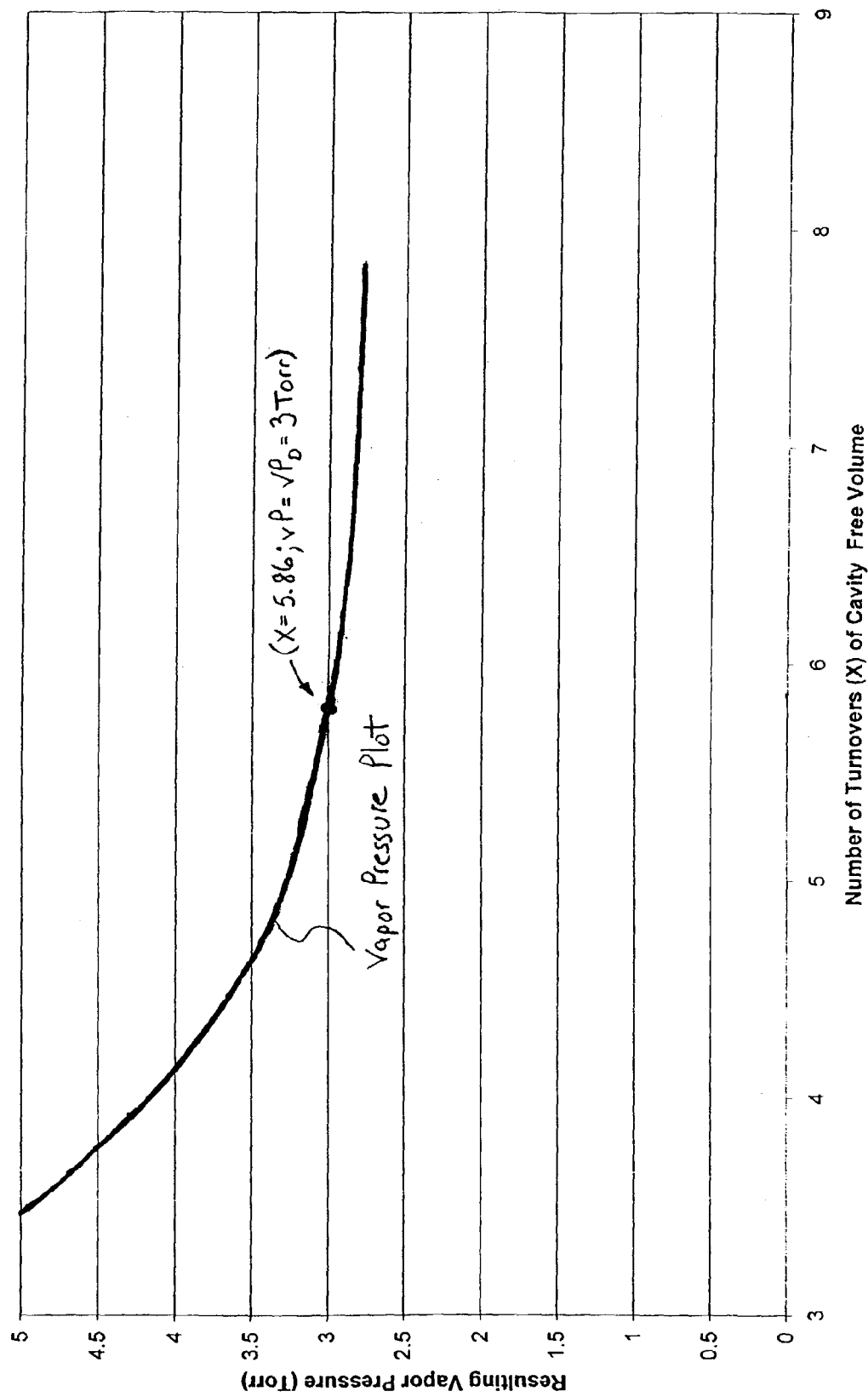

FORCED GAS FLOW CANISTER DEHYDRATION

BACKGROUND OF THE INVENTION

This invention relates generally to the field of storing radioactive elements and specifically to systems and methods of drying spent nuclear fuel in preparation for long-term storage in the "dry state."

In the operation of nuclear reactors, hollow zircaloy tubes filled with enriched uranium, known as fuel assemblies, are burned up inside the nuclear reactor core. It is customary to remove these fuel assemblies from the reactor after their energy has been depleted down to a predetermined level. Upon depletion and subsequent removal, this spent nuclear fuel ("SNF") is still highly radioactive and produces considerable heat, requiring that great care be taken in its subsequent packaging, transporting, and storing. Specifically, the SNF emits extremely dangerous neutrons and gamma photons. It is imperative that these neutrons and gamma photons be contained at all times subsequent to removal from the reactor core.

In defueling a nuclear reactor, it is common place to remove the SNF from the reactor and place the SNF under water, in what is generally known as a spent fuel pool or pond storage. The pool water facilitates cooling of the SNF and provides adequate radiation shielding. The SNF is stored in the pool for a period long enough to allow the decay of heat and radiation to a sufficiently low level to allow the SNF to be transported with safety. However, because of safety, space, and economic concerns, use of the pool alone is not satisfactory where the SNF needs to be stored for any considerable length of time. Thus, when long-term storage of SNF is required, it is standard practice in the nuclear industry to store the SNF in a dry state subsequent to a brief storage period in the spent fuel pool, i.e., storing the SNF in a dry inert gas atmosphere encased within a structure that provides adequate radiation shielding. One typical structure that is used to store SNF for long periods of time in the dry state is a storage cask.

Storage casks have a cavity adapted to receive a canister of SNF and are designed to be large, heavy structures made of steel, lead, concrete and an environmentally suitable hydrogenous material. However, because the focus in designing a storage cask is to provide adequate radiation shielding for the long-term storage of SNF, size and weight are often secondary considerations (if considered at all). As a result, the weight and size of storage casks often cause problems associated with lifting and handling. Typically, storage casks weigh more than 100 tons and have a height greater than 15 ft. A common problem associated with storage casks is that they are too heavy to be lifted by most nuclear power plant cranes. Another common problem is that storage casks are generally too large to be placed in spent fuel pools. Thus, in order to store SNF in a storage cask subsequent to being cooled in the pool, the SNF is transferred to a cask, removed from the pool, placed in a staging area, dewatered, dried, and transported to a storage facility. Adequate radiation shielding is needed throughout all stages of this transfer procedure.

As a result of the SNF's need for removal from the spent fuel pool and additional transportation to a storage cask, an open canister is typically submerged in the spent fuel pool. The SNF rods are then placed directly into the open canister while submerged in the water. However, even after sealing, the canister alone does not provide adequate containment of the SNF's radiation. A loaded canister cannot be removed or transported from the spent fuel pool without additional radiation shielding. Thus, apparatus that provide additional radiation shielding during the transport of the SNF is necessary. This additional radiation shielding is achieved by placing the SNF-loaded canisters in large cylindrical containers called transfer casks while still within the pool. Similar to storage casks, transfer casks have a cavity adapted to receive the canister of SNF and are designed to shield the environment from the radiation emitted by the SNF within.

In facilities utilizing transfer casks to transport loaded canisters, an empty canister is first placed into the cavity of an open transfer cask. The canister and transfer cask are then submerged in the spent fuel pool. Prior to cask storage, the SNF is removed from the reactor and placed in wet storage racks arrayed on the bottom of spent fuel pools. For dry storage, the SNF is transferred in the submerged canister that is flooded with water and within the transfer cask. The loaded canister is then fitted with its lid, enclosing the SNF and the water from the pool within. The loaded canister and transfer cask are then removed from the pool by a crane and set down in a staging area to prepare the SNF-loaded canister for long-term dry storage. In order for an SNF-loaded canister to be properly prepared for dry storage, the United States Nuclear Regulatory Commission ("N.R.C.") requires that the SNF and interior of the canister be adequately dried before the canister is sealed and transferred to the storage cask. Specifically, N.R.C. regulations mandate that the vapor pressure ("vP") within the canister be below 3 Torrs (1 Torr=1 mm Hg) before the canister is backfilled with an inert gas and sealed. Vapor pressure is the pressure of the vapor over a liquid at equilibrium, wherein equilibrium is defined as that condition where an equal number of molecules are transforming from the liquid phase to gas phase as there are molecules transforming from the gas phase to liquid phase. Requiring a low vP of 3 Torrs or less assures that an adequately low amount of moisture exists in the interior of the canister and on the SNF so that the SNF is sufficiently dry for long-term storage.

Currently, nuclear facilities comply with the N.R.C.'s 3 Torr or less vP requirement by performing a vacuum drying process. In performing this process, the bulk water that is within the canister is first drained from the canister. Once the bulk of the liquid water is drained, a vacuum system is coupled to the canister and activated so as to create a sub-atmospheric pressure condition within the canister. The sub-atmospheric condition within the canister facilitates evaporation of the remaining liquid water while the vacuum helps remove the water vapor. The vP within the canister is then measured by placing appropriate measuring instruments, such as vacuum gages, into the canister and taking direct measurements of the gaseous contents present therein. If necessary, this vacuum procedure is repeated until a vP of 3 Torrs or less is obtained. Once an acceptable vP is reached, the canister is backfilled with an inert gas and the canister is sealed. The transfer cask (with the canister therein) is then transported to a position above a storage cask and the SNF-loaded canister is lowered into the storage for long-term storage.

Current methods of satisfying the N.R.C.'s 3 Torrs or less vP requirement are potentially dangerous, operationally time consuming, prone to error, subjects the SNF rods to high temperatures, and costly. First, the intrusive nature of the direct vP measurement is dangerous because the canister contains highly radioactive SNF. Any time the canister must be physically breached, there is the danger of exposing the surrounding environment and the work personnel to radiation. Moreover, the creation of sub-atmospheric conditions in the canister requires expensive vacuum equipment and can cause complicated equipment problems. Finally, the operational durations for vacuum drying are unacceptably long as vacuum drying times on the order of days is quite common. The vacuum operation is prone to line freeze ups and ice formation inside canister which can give false readings to the instruments. Lowering of the canister pressure causes a progressive loss of the heat transfer medium (gas filling the gaps and open spaces in the canister) resulting in substantial elevation of temperature of heat producing SNF rods.

SUMMARY OF THE INVENTION

An object of the present invention is to provide a method and system for drying the interior of an SNF-loaded cavity.

Another object of the present invention is to provide a method and system for drying the interior of an SNF-loaded cavity without the need to intrusively physically measure the vP within the cavity to ensure that an acceptably low vP is within the cavity.

Yet another object of the present invention is to provide a method and system for drying the interior of an SNF-loaded cavity without subjecting the interior of the cavity to sub-atmospheric conditions.

Still another object of the present invention is to provide a method and system for adequately drying the interior of an SNF-loaded cavity without using expensive vacuum equipment.

A further object of the present invention is to provide a method and system for preparing an SNF-loaded cavity for dry storage in a more time efficient manner.

A yet further object of the present invention is to provide a method and system for preparing an SNF-loaded cavity for dry storage in a more cost effective manner.

An additional object of the present invention is to provide a method and system for drying that eliminates excessive SNF rods temperatures associated with prior art.

These objects and other are met by the present invention which in one aspect comprises a method of drying a cavity loaded with radioactive elements, the loaded cavity having a free volume ($V_F$), a starting vapor pressure ($vP_S$), and a cavity pressure ($P_C$), the method comprising: determining a desired degree of dryness in the cavity in terms of a desired vapor pressure ($vP_D$); cooling a non-reactive gas to a temperature ($T_C$) thereby drying the non-reactive gas; introducing the dry non-reactive gas at a flow rate (R) into the cavity for a period of time (t); and removing wet non-reactive gas from the cavity; wherein $T_C$ and R are controlled to achieve the desired vapor pressure ($vP_D$) in the cavity after time t.

It is preferable that this method further comprise the step of heating the dry non-reactive gas to a temperature ($T_H$) after the cooling step and prior to the introduction step, wherein $T_H$ is controlled to achieve the desired vapor pressure $vP_D$ in the cavity after time t.

It is further preferred that the cooling step comprise the steps of flowing the non-reactive gas through a condenser and then flowing the non-reactive gas through a demoisturizer module that freeze dries the non-reactive gas, wherein the demoisturizer module is adapted to exit the non-reactive gas at temperature $T_C$. The wet non-reactive gas removed from the cavity can be re-circulated by subjecting the removed wet non-reactive gas to the cooling step. Moreover, this method will preferably comprise the additional steps of: ceasing the introduction of the dry non-reactive gas into the cavity after time t has passed; and sealing the cavity thereby forming an atmosphere of dry non-reactive gas within the cavity, the cavity having a vapor pressure at or below $vP_D$.

Depending on the equipment available, the controlled flow rate R can be a volumetric flow rate or a mass flow rate. Suitable non-reactive gases include nitrogen, carbon-dioxide and light hydrocarbon gases (e.g. methane) and an inert gases selected from the group consisting of helium, argon, krypton and xenon. It is preferred that the desired vapor pressure $vP_D$ in the cavity be at or below about 3 Torrs which will correspond to the temperature $T_C$ being at or below about 21 degrees Fahrenheit.

In another aspect, the invention is a method of drying a cavity loaded with radioactive elements, the loaded cavity having a free volume ($V_F$), a starting vapor pressure ($vP_S$), and a cavity pressure ($P_C$), the method comprising: determining a desired degree of dryness in the cavity in terms of a desired vapor pressure ($vP_D$); cooling a non-reactive gas to a temperature ($T_C$) thereby drying the non-reactive gas; introducing the dry non-reactive gas into the cavity so that the free volume $V_F$ of the cavity turns over X times; and removing wet non-reactive gas from the cavity; wherein $T_C$ and X are controlled to achieve a desired vapor pressure ($vP_D$) in the cavity.

It is preferable that this method further comprise the step of heating the dry non-reactive gas to a temperature ($T_H$) after the cooling step and prior to the introduction step, wherein $T_H$ is controlled to achieve the desired vapor pressure $vP_D$. The cooling step of this method can comprise the steps of flowing the non-reactive gas through a condenser module and then flowing the non-reactive gas through a demoisturizer module that freeze dries the non-reactive gas, wherein the demoisturizer module is adapted to exit the non-reactive gas at the temperature $T_C$.

This method can further comprise the steps of re-circulating the wet non-reactive gas removed from the cavity by subjecting the removed wet non-reactive gas to the cooling step; ceasing the introduction of the dry non-reactive gas into the cavity after the free volume $V_F$ of the cavity is turned-over X times; and sealing the cavity thereby forming an atmosphere of dry non-reactive gas within the cavity, the cavity having a vapor pressure at or below $vP_D$.

Suitable non-reactive gases include nitrogen, carbon dioxide, and light hydrocarbon gases such as methane, and inert gases selected from the group consisting of helium, argon, krypton, and xenon. The desired vapor pressure $vP_D$ can be at or below about 3 Torrs which corresponds to the temperature $T_C$ being at or below about 21 degrees Fahrenheit.

In yet another aspect, the invention is a system for drying a cavity loaded with radioactive elements, the loaded cavity having a free volume ($V_F$), a starting vapor pressure ($vP_S$), and a cavity pressure ($P_C$), the system comprising: a non-reactive gas source adapted to supply a non-reactive gas to the system; means to cool a non-reactive gas to a temperature ($T_C$) thereby drying the non-reactive gas; means to flow the dry non-reactive gas to the cavity, the flow means adapted to introduce the dry non-reactive gas to the cavity at a flow rate R for a period of time (t); means to remove wet non-reactive gas from the cavity; wherein the non-reactive gas source, the cooling means, the flow means, the removal means, and the cavity are fluidly coupled; wherein $T_C$ and R are controlled to achieve a desired vapor pressure ($vP_D$) in the cavity in time t.

It is preferred that the system further comprise means to heat the dry non-reactive gas to a temperature ($T_H$), the heating means fluidly coupled to the system downstream of the cooling means and upstream of the cavity, wherein $T_H$ is controlled to achieve the desired vapor pressure $vP_D$. This heating means is preferably an auxiliary heater.

The flow rate R can be a mass flow rate or a volumetric flow rate. The flow means can be a gas circulator and the cooling means can comprise a condenser module fluidly coupled upstream to a demoisturizer module, the demoisturizer module adapted to freeze dry the non-reactive gas so that the non-reactive gas that exits the demoisturizer module is at temperature $T_C$.

It is further preferable that the system be adapted to re-circulate the wet non reactive gas that is removed from the cavity through the system. The non-reactive gas can be nitrogen, carbon-dioxide, light hydrocarbon gases such as methane, or an inert gas selected from the group consisting of helium, argon, krypton and xenon. The desired vapor pressure vP in the cavity of the cavity is preferably at or below about 3 Torrs which corresponds to temperature $T_C$ being at or below about twenty-one degrees Fahrenheit.

Finally, it is preferred that the cavity have a top and a bottom, and the system be adapted to supply the dry non-reactive gas to the cavity at or near the bottom of the cavity and further adapted to remove the wet non-reactive gas from the cavity at or near the top of the cavity.

BRIEF DESCRIPTION OF THE DRAWINGS

FIG. 7 is a data graph plotting simulated data for resulting vapor pressure in a cavity of a canister after dry heated helium gas is flowed through the cavity for various times.

FIG. 8 is a data graph plotting the number of turnovers of free volume of a cavity versus resulting vapor in the cavity.

FIG. 9 is an enlarged view of area IX—IX in FIG. 8.

DETAILED DESCRIPTION OF THE DRAWINGS

Figure 1:
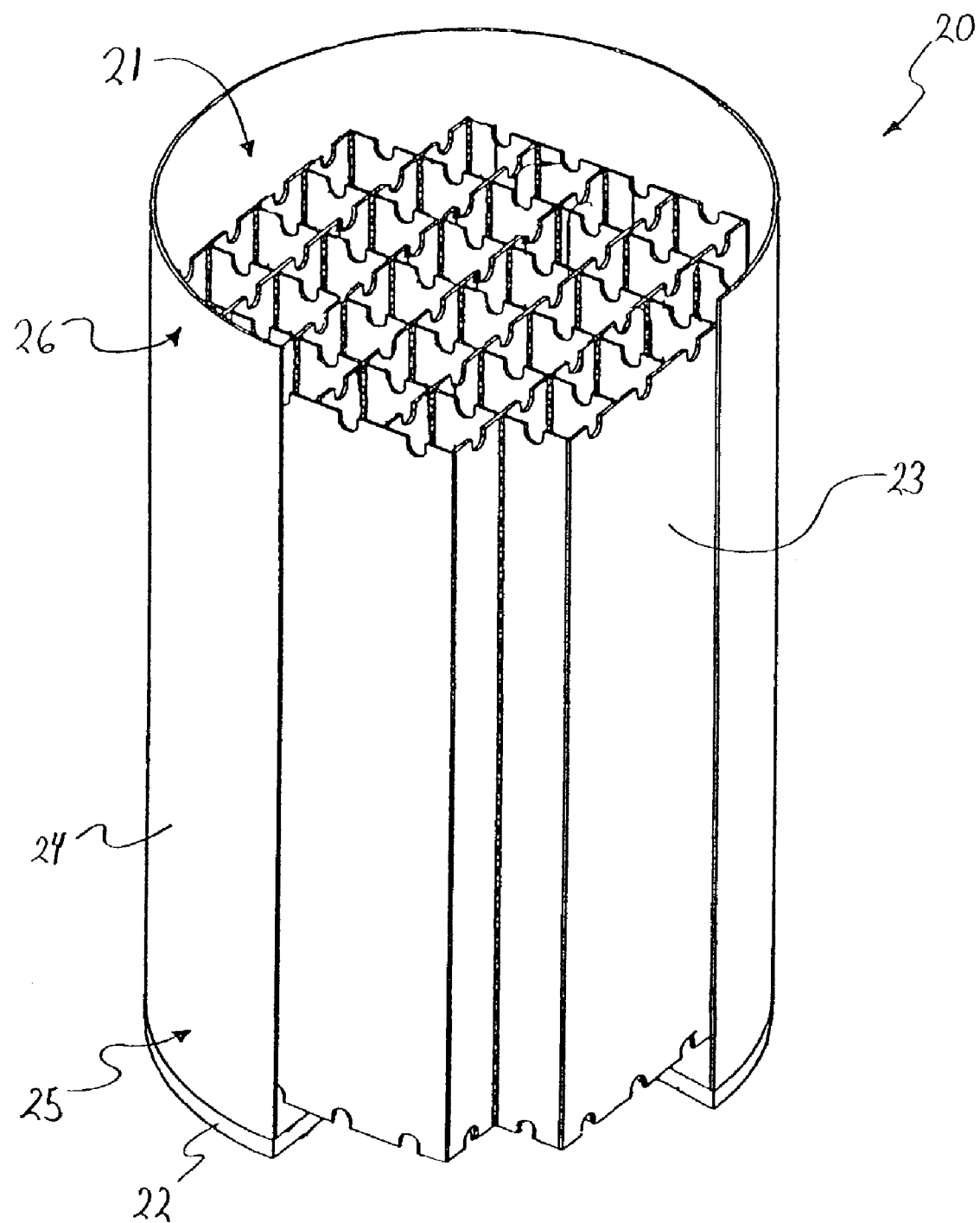
FIG. 1 is a perspective view of an open canister partially in section and empty.

FIG. 1 illustrates a canister 20 that is suitable for use in the present invention. Canister 20 is illustrated for exemplary purposes only. The present invention is not limited to specific geometries, structures, or dimensions but is applicable to any type of enclosure vessel used to transport, store, or hold radioactive elements. Thus, the scope of the present invention also encompasses cask embodiments where spent nuclear fuel ("SNF") is loaded directly into the cask's cavity without the use of a canister.

Canister 20 comprises bottom plate 22 and cylindrical wall 24 which forms cavity 21. As used herein, that end 25 of canister 20 that is closest to bottom plate 22 will be referred to as the bottom of the canister 20 while that end 26 of canister 20 that is furthest from bottom plate 22 will be referred to as the top of the canister 20. The cavity 21 of canister 20 has honeycomb grid 23 positioned therein. Honeycomb grid 23 comprises a plurality of rectangular boxes adapted to receive spent nuclear fuel ("SNF") rods.

Canister 20 further comprises a drainage hole (not illustrated) located at or near the bottom of canister 20 that provides a sealable passageway from outside canister 20 to cavity 21. The drainage hole can be located on bottom plate 22. Furthermore, the drainage hole can be opened or hermetically sealed using conventional plugs, drain valves, or welding procedures.

As illustrated in FIG. 1, canister 20 is empty (i.e. cavity 21 does not have SNF rods placed in honeycomb grid 23) and the top 26 of canister 20 is open. In utilizing canister 20 to transport and store SNF rods, canister 20 is placed inside transfer cask 10 (FIG. 2) while canister 20 is open and empty. The drainage hole located at or near the bottom of canister 20 is closed and hermetically sealed at this time. Open transfer cask 10 and open canister 20 are then submerged into a spent fuel pool which causes the remaining volume of cavity 21 to become filled with water. SNF rods that are removed from the nuclear reactor are then submerged into the spent fuel pool and placed inside cavity 21 of canister 20. Preferably, a single bundle of SNF rods is placed in each rectangular box of honeycomb grid 23. Once cavity 21 is loaded with the SNF rods, canister lid 27 (FIG. 2) is secured to the top 26 of canister 20 so as to seal the SNF rods and pool water in cavity 21. Canister lid 27 has a plurality of sealable lid holes 28 that form a passageway into cavity 21 from outside of the canister 20 when open. Transfer cask 10 (having loaded and sealed canister 20 therein) is then lifted from the spent fuel pool by a crane and placed uprightly in a staging area (as shown in FIG. 2) so that canister 20 can be properly prepared for dry-storage.

Figure 2:
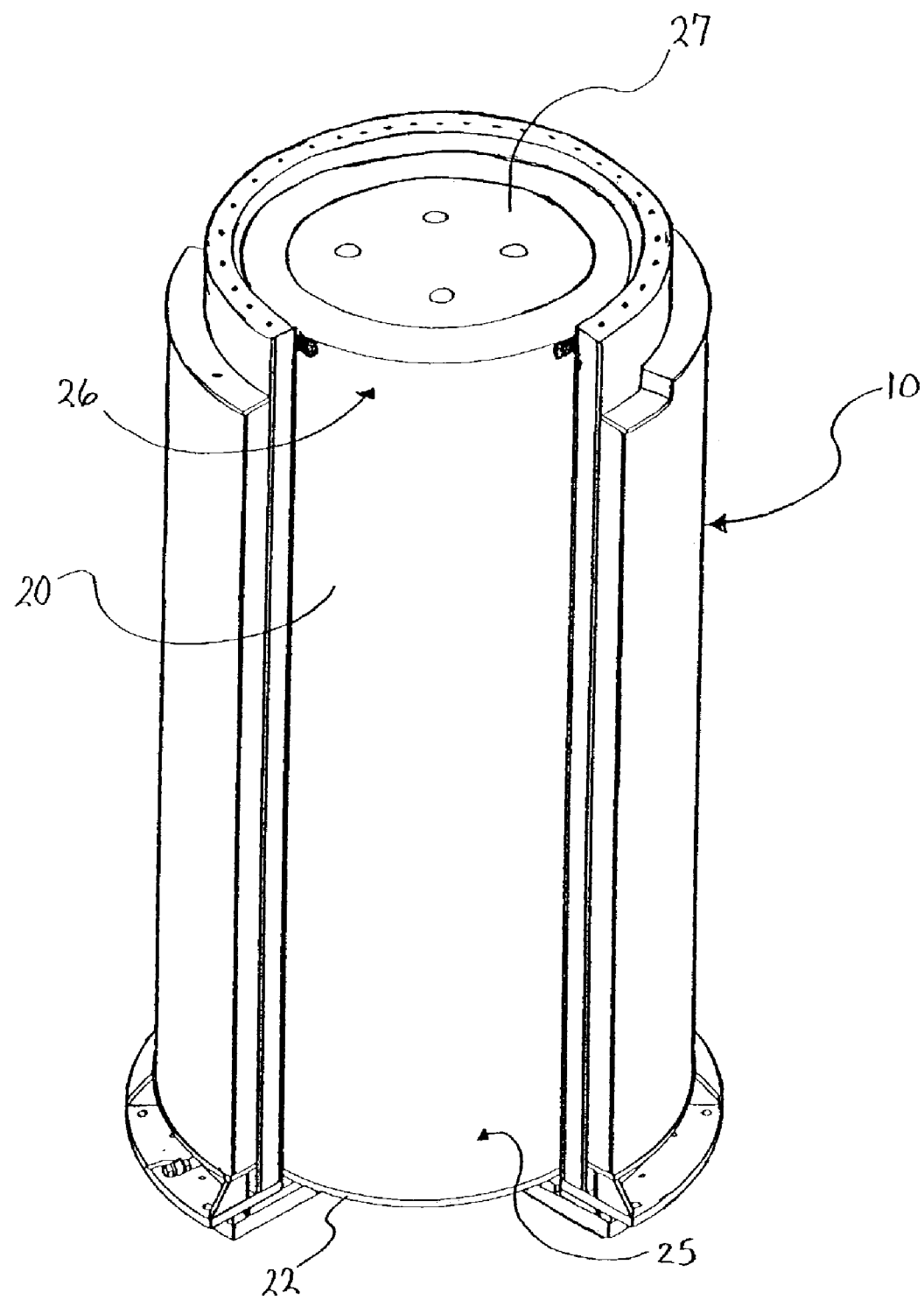
FIG. 2 is a perspective view of a transfer cask partially in section with the canister of FIG. 1 sealed and positioned in the transfer cask.

Referring to FIG. 2, when in the staging area, canister 20 (containing the SNF rods and pool water) is within transfer cask 10. Both canister 20 and transfer cask 10 are in an upright position. Once properly positioned in the staging area, the drainage hole (not illustrated) at or near the bottom 25 of canister 20 is opened and the bulk water that is trapped in cavity 21 of canister 20 is drained. Despite draining the bulk water from cavity 21, water moisture remains in cavity 21 and on the SNF rods due to trace amounts of liquid water and water vapor remaining inside cavity 21. However, before the canister 20 can be permanently sealed and transported to a storage cask for long-term dry storage, it must be assured that cavity 21 and the SNF rods contained therein are adequately dried. Because a low vapor pressure ("vP") within a container indicates that a low level of moisture is present, the United States Nuclear Regulatory Commission ("N.R.C") has decided that adequate drying is achieved when a vapor pressure ("vP") of 3 Torrs or less is obtained within cavity 21.

Figure 3:
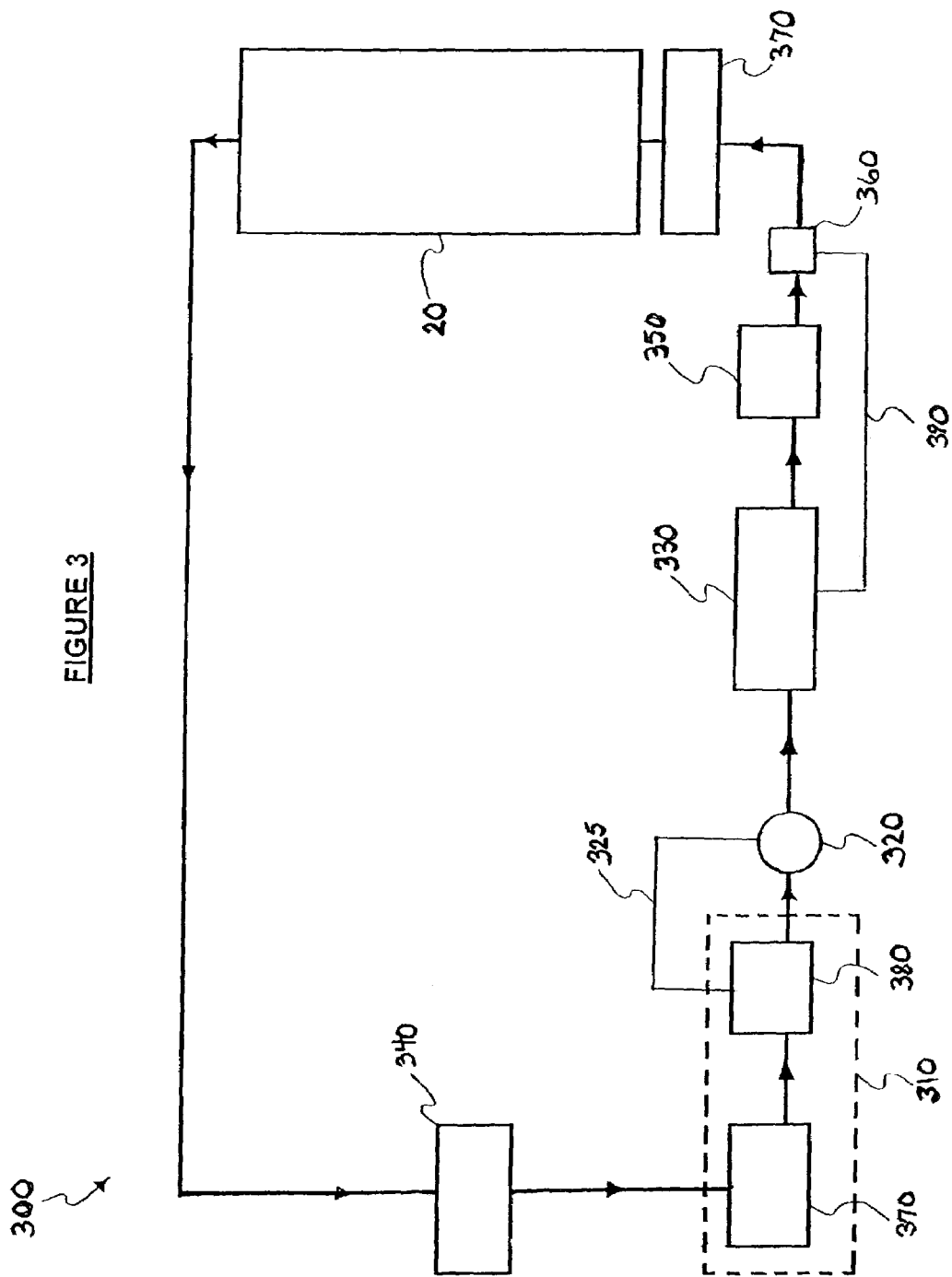
FIG. 3 is a schematic diagram of a closed-loop system according to the present invention.
Figure 5:
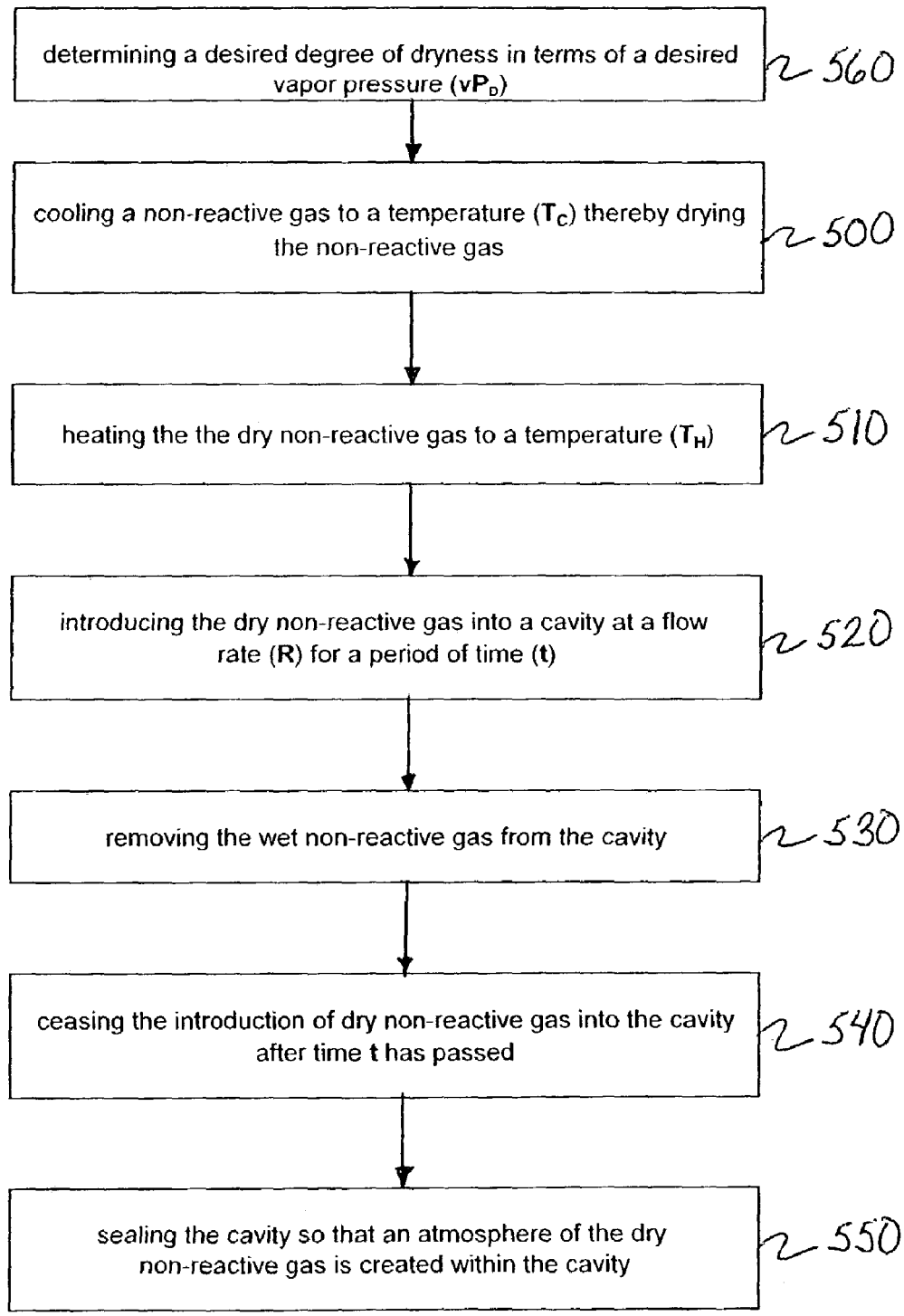
FIG. 5 is a flowchart of a first embodiment of a method according to the present invention.
Figure 6:
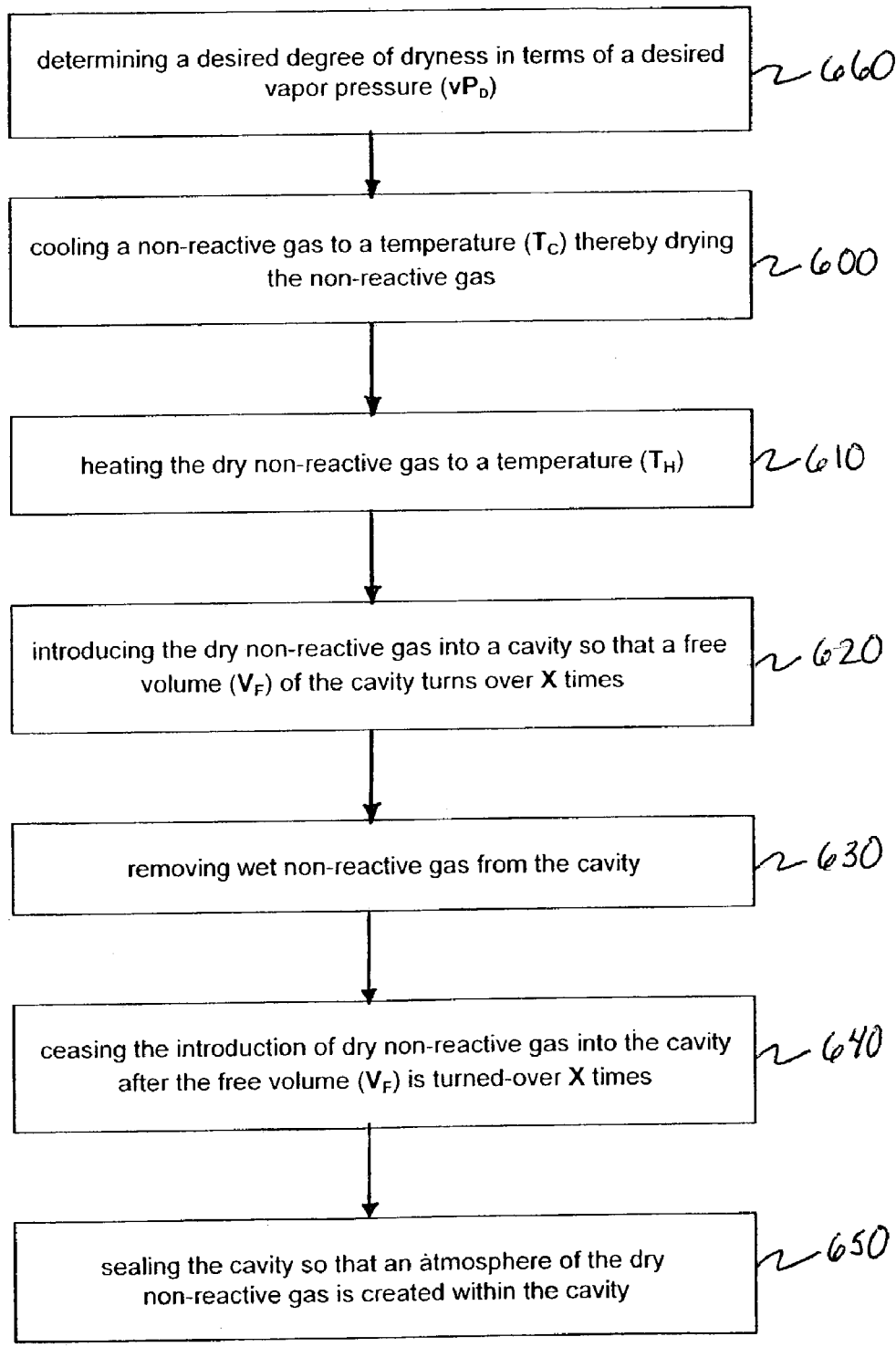
FIG. 6 is a flowchart of a second embodiment of a method according to the present invention.

FIG. 3 schematically illustrates an embodiment of a closed-loop system 300 capable of drying cavity 21 to acceptable N.R.C. levels without the need to intrusively measure the resulting vP within cavity 21. FIG. 5 is a flowchart of one embodiment of a method of operating system 300 according to the present invention. FIG. 6 is a flowchart of a second embodiment of a method of operating system 300 according to the present invention.

System 300 is connected to canister 20 so as to form a closed-loop system. However, the present invention can be practiced without having a closed-loop system. System 300 comprises non-reactive gas reservoir 340, gas cooling element 310, temperature sensor 320, gas circulator 330, auxiliary heater 350, gas flow controller 360, and gas distributor 370. As illustrated, gas cooling element 310 comprises condenser 370 and demoisturizer module 380. All of these elements are fluidly connected so that a non-reactive gas can flow through system 300 without escaping into the exterior environment. All fluid connections discussed herein can be accomplished through the use of suitable tubing or piping which fluidly connects the elements of system 300 through the use of threaded connections, seals, ring clamps, and/or gaskets. The piping and tubing can be constructed of flexible or non-flexible metal conduits. The design to fluidly connect the piping and tubing to the various elements of system 300 will be mandated by the specific design structure of the equipment chosen and the material composition of the piping or tubing chosen.

It is preferred that non-reactive gas reservoir 340 be used to store helium gas. While helium gas is the preferred non-reactive gas, any non-reactive gas can be used in system 300 and still be within the scope of the present invention. For example, the non-reactive gas can be nitrogen, carbon-dioxide, light hydrocarbon gases such as methane, or any inert gas, including but not limited to helium, argon, krypton and xenon.

Flow of gaseous helium through system 300 is effectuated by gas circulator 330. Gas circulator 330 circulates the helium gas though system 300 and canister 20 by increasing the pressure of the helium gas as it exits gas circulator 330. As such the helium gas that exits gas circulator 330 is forced counter-clockwise through system 300. The direction of gas flow through system 300 is delineated by the arrows present on the fluid connections.

Helium reservoir 340 provides an adequate source of helium gas to system 300. Helium reservoir 340 is fluidly connected to condenser 370. As helium gas is forced through system 300, helium gas that is within helium reservoir 340 flows into condenser 370. As the helium gas flows through condenser 370, the helium gas is cooled. This cooling results in some of the moisture (i.e. water vapor) that is trapped in the helium gas to condense out of the helium gas and gather in condenser 370 in liquid form. The liquid water is removed from condenser 370 via a fluid drain (not illustrated) while the partially dried helium gas flows into demoisturizer module 380 (also known as a freeze dryer) via a separate fluid connection. The partially dried helium gas then flows through demoisturizer module 380 where the helium gas is further cooled by freeze-drying the helium gas with a refrigerant fluid that flows through a tubular heat exchanger. This further reduction in temperature of the partially dried helium gas results in additional moisture being removed from the helium gas. As such, the helium gas that exits demoisturizer module 380 has a very low moisture content (i.e. a low vapor pressure) and is very dry. The moisture that is removed from the helium gas in demoisturizer module 380 is frozen directly on the refrigerated fluid cooled heat exchanger tubes.

By monitoring the temperature of the helium gas flowing out of demoisturizer module 380 and assuring that the temperature is adequately low, it can be ensured that the helium gas is very dry. Demoisturizer module 380 is adapted to ensure that the exiting helium gas is cooled to a desired low temperature $T_C$. This is done by monitoring the temperature of the helium gas exiting demoisturizer module 380 with temperature sensor 320. Temperature sensor 320 is operably coupled to demoisturizer module 380 through electrical connection 325. Through the use of a user interface and properly programmed processors (not illustrated), the desired temperature $T_C$ is inputted by a user. Temperature sensor 320 repetitively measures the temperature of the helium gas exiting demoisturizer module 380. If the temperature of the exiting helium gas does not match the inputted desired temperature $T_C$, an appropriate signal is sent to demoisturizer module 380. Demoisturizer module 380 will appropriately respond to the signal by either increasing or decreasing the cooling of the helium gas, depending on the signal sent. This adjustment process is repeated until the helium gas exiting demoisturizer module achieves (and maintains) the desired a temperature at or below $T_C$, thus completing steps 500 and 600 of FIGS. 5 and 6 respectively. As will be discussed in detail below, $T_C$ is chosen by the user to ensure that the exiting helium gas is sufficiently dry so as to be capable of removing adequate amounts of moisture from cavity 21 (FIG. 1) to achieve a desired vapor pressure ($vP_D$) in cavity 21.

The dry helium gas (which is at the desired temperature $T_C$) flows into gas circulator 330, which as discussed above, increases the pressure of the dry helium gas so as to force the dry helium gas to circulate into auxiliary heater 350 and throughout system 300. Auxiliary heater 350 is fluidly connected downstream of gas circulator 330. Upon entering auxiliary heater 350, the dry helium gas is super-heated to a desired heated temperature ($T_H$), thus completing steps 510 and 610 of FIGS. 5 and 6 respectively. Increasing the temperature of the helium gas to $T_H$ helps facilitate the removal of moisture from cavity 21 (including moisture on the SNF rods) when the helium gas enters cavity 21. However, because SNF rods often generate great amounts of heat, the use of auxiliary heater 350 may not be necessary in such instances. Auxiliary heater 350 ensures that the dry helium gas exiting auxiliary heater 350 is maintained at temperature $T_H$ through the use of an operably coupled temperature sensor (not illustrated). In order to avoid redundancy, discussion of this operable connection will be omitted with the understanding that the connection and controls are similar to those used for demoisturizer module 380 and temperature sensor 320.

Upon leaving auxiliary heater 350, the dry helium gas (now at temperature $T_H$) flows into gas flow controller 360. Gas flow controller element 360 is operably coupled to gas circulator 330 by electrical connection 390. Depending on which method of the present invention is being used, gas flow controller 360 can be either a volumetric flow rate controller or a mass flow rate controller.

If gas flow controller 360 is a volumetric flow rate controller, a valve will be adapted to flow helium gas therethrough at a constant desired volumetric flow rate (R). The desired volumetric flow rate R is inputted by a user via a coupled user interface having properly programmed processors (not illustrated). The properly programmed processors will send a signal to the volumetric flow rate valve to adjust the valve so that the desired volumetric flow rate R is achieved. In this embodiment, the user will also enter a desired time (t) into the user interface. Upon time t passing, the properly programmed processor will send a cease operation signal to gas circulator 330, stopping the flow of helium gas through system 300. It is in this way that gas flow controller 360 facilitates step 520 of FIG. 5.

Another way in which step 520 of FIG. 5 can be facilitated is through the use of a mass flow controller. If gas flow controller 360 is a mass flow rate controller, a valve will be adapted to measure the mass of the heated dry helium gas flowing through the mass flow controller. The user will input a desired mass flow rate (R) and a desired time t rather than a volumetric flow rate value. Discussion of how the user determines what the desired flow rate R, whether a mass flow rate or a volumetric flow rate, and time t are will be had in detail below.

Alternatively, gas flow controller 360 can be adapted so that the user inputs a numerical value X into the user interface, wherein the value X represents the number of times the user wishes the free volume ($V_F$) of cavity 21 to be turned-over by the helium gas flow. As used herein, the free volume ($V_F$) of a cavity is defined as that space of the cavity that is not occupied by the loaded SNF rods nor the honeycomb grid 23. While the value of $V_F$ will be different for various canisters and will depend on whether the canister is fully loaded with SNF rods, the $V_F$ for any given canister can be approximated by knowing the number and size of the SNF rods to be loaded into the cavity and the volume of the cavity when empty. As used throughout this patent, the $V_F$ is turned-over when enough gas is flowed into the cavity to fill the free volume $V_F$ and replace the gas that formerly occupied the volume. For example, if $V_F$ is equal to 300 cubic feet and a volume of 600 cubic feet of dry helium gas is flowed into $V_F$, the free volume $V_F$ is "turned-over" twice. Thus, X would be 2.0. In this embodiment of system 300, the user chooses X so that the $V_F$ is turned-over a specific number of times resulting in the vapor pressure in the cavity achieving a desired vapor pressure $vP_D$. How a user calculates the desired X will be discussed in detail below. Assuming that the desired X is know, the user inputs this value into the user interface instead of an R and t. A properly programmed processor will communicate with control gas flow controller 360, be it a mass flow controller or a volumetric flow rate controller, to supply a volume of dry helium gas that will turn-over $V_F$ of the cavity the desired X times, thus completing step 620 of FIG. 6. Once a volume of dry helium gas resulting in the desired X is supplied to cavity 21, the properly programmed processor will send a cease operation signal to gas circulator 330, stopping the flow of helium gas through system 300.

Upon exiting gas flow controller 360, the dry helium gas flows into gas distributor 370. Gas distributor 370 is fluidly coupled to canister 20 and is adapted to introduce the heated dry helium gas into cavity 21 (FIG. 1) at or near the bottom of canister 20 possibly through the same drain valve (not illustrated) used to drain the bulk water. Gas distributor 370 introduces the heated dry helium gas into the $V_F$ of cavity 21, thus completing steps 520 and 620 of FIGS. 5 and 6 respectively. Once inside cavity 21, the dry helium gas becomes wet by absorbing moisture. This adsorption of moisture by the dry helium gas occurs both by mixing with the water vapor already in cavity 21 and by evaporating liquid water that may remain in cavity 21 and on the SNF-rods. If the dry helium gas is superheated to temperature $T_H$, the added energy in the dry helium gas will help initiate evaporation of the liquid water. As the dry helium gas is continually introduced into cavity 21, the $V_F$ of cavity 21 becomes filled. Once the $V_F$ is filled, the continual supply of dry helium gas pushes the wet helium gas out of cavity 21 from an outlet orifice at or near its top, thus completing steps 530 and 630 of FIGS. 5 and 6 respectively. The outlet orifice may be sealable canister lid holes 28 (FIG. 2). This removal of wet helium gas from the cavity 21 lowers the resulting vapor pressure in cavity 21. As the wet helium gas flows out of cavity 21, the wet helium gas is carried through a fluid connection to helium reservoir 340. As such, the wetted helium gas can be re-circulated through system 300 to sustain a continuous canister drying process.

As mentioned above, once the heated dry helium gas is circulated through cavity 21 at rate R for period of time t, the introduction of the heated dry helium gas into cavity 21 is ceased, thus completing step 540 of FIG. 5. In the alternative embodiment, the introduction of the heated dry helium gas into cavity 21 is ceased when the heated dry helium gas is circulated through cavity 21 so that $V_F$ "turns-over" X times, thus completing step 640 of FIG. 6. At this point, system 300 is disconnected from canister 20 and all opening into cavity 21, including the drain valve and orifices, are sealed, thereby trapping the dry helium gas in cavity 21 and creating a non-reactive atmosphere within cavity 21, thus completing steps 550 and 650 of FIGS. 5 and 6 respectively.

Figure 4:
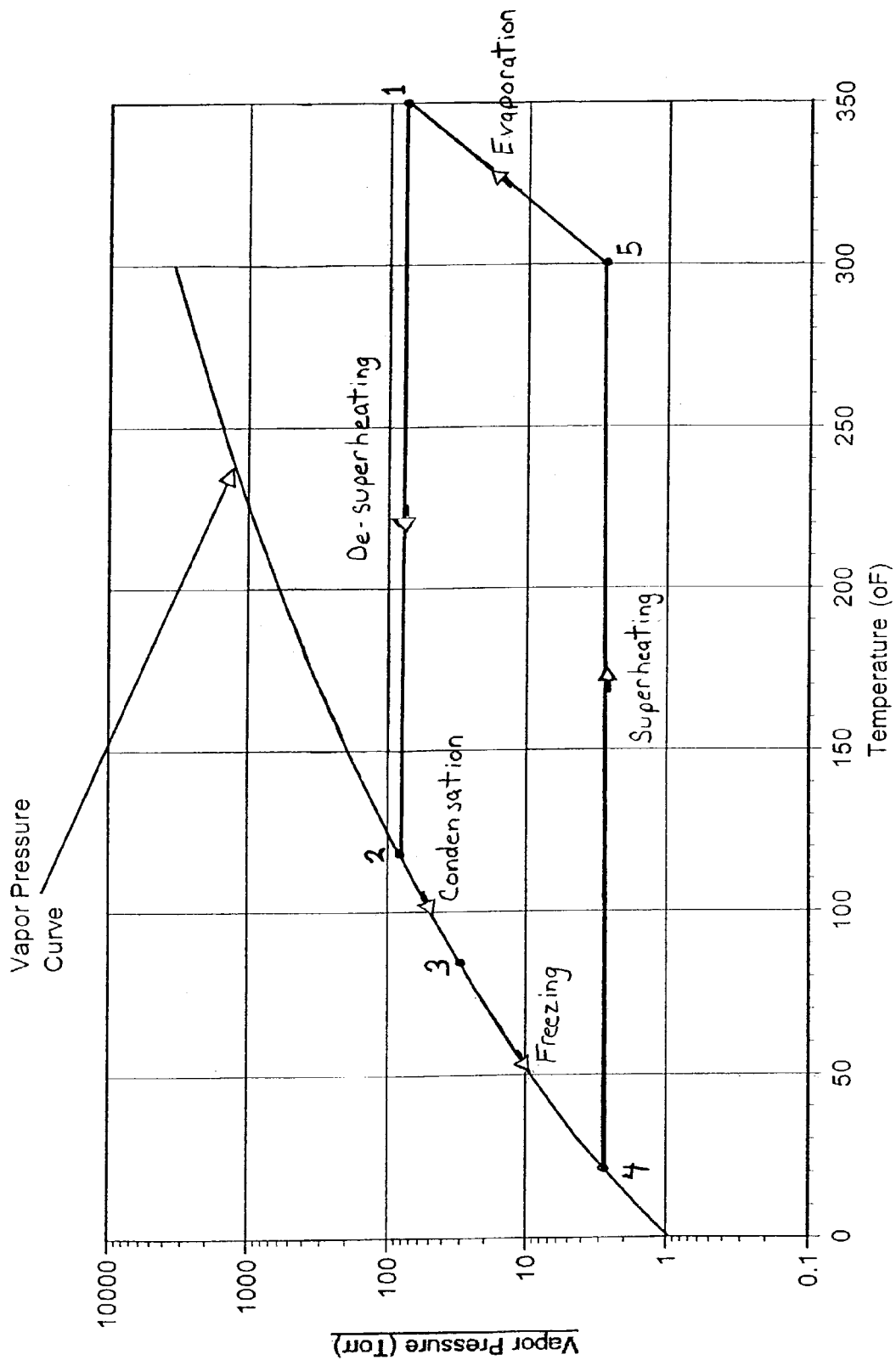
FIG. 4 is a graph illustrating the thermodynamic cycle of helium gas flowing through the system of FIG. 3 under specified conditions.

Referring to FIG. 4, a thermodynamic cycle of the helium gas circulating through system 300 is illustrated on a Vapor Pressure-Temperature diagram. Plotted in this diagram is the vapor pressure curve for water. Above the vapor pressure curve, water is in the liquid state and below the curve water is in the vapor state. Vapor and liquid co-exist in equilibrium at any point on the curve. For illustrative purposes, the thermodynamic graph assumes that system 300 is being operated so that $T_C$ is 21 degrees Fahrenheit, $T_H$ is 300 degrees Fahrenheit, and the starting vapor pressure ($vP_S$) in cavity 21 is 87 Torrs. As used herein the starting vapor pressure $vP_S$ in a cavity is the vapor pressure in that cavity after draining the bulk water therefrom but before any dry helium gas is circulated therethrough. Starting at point 1 on the diagram, superheated helium gas laden with water vapor exits cavity 21 of canister 20 and enters condenser 370. Once inside condenser 370, the superheated helium gas is cooled along line 1-2 until the dewpoint is reached at the intersection with the vapor pressure curve, i.e., point 2. Cooling of the helium gas continues in condenser 370 below the dewpoint, progressively condensing water vapor out of the helium gas down the vapor pressure curve along line 2-3. The liquid that is condensed from 2-3 is separated and removed from the condenser while the partially dried helium gas flows into demoisturizer module 380 where it is freeze-dried. While in demoisturizer module 380, the helium gas is further cooled below dewpoint, condensing even more water vapor out of the helium gas along line 3-4 until $T_C$ (which is 21 degrees Fahrenheit) is reached. The dried helium gas leaves condenser module 380 and is superheated to $T_H$ in auxiliary heater 350 along line 4-5 to help effectuate the evaporation of liquid water in cavity 21. If the SNF rods are hot enough, this superheating will occur inside cavity 21, thus eliminating the need for auxiliary heater 350. Once inside cavity 21, the dry helium gas is heated even further due to the heat given off by the SNF rods and the heated dry helium gas absorbs water vapor from the evaporating liquid water, thus wetting and increasing the vapor pressure of the dry helium gas along line 5-1. So long as the dry helium gas flows through cavity 21, the vapor pressure within cavity 21 will continue to decrease. This will also result in the vapor pressure of the exiting wet helium gas (at point 5) to decrease as time passes. The vapor pressure within cavity 21 will continue to decrease monotonically to approach the vapor pressure of the heated dry non-reactive gas entering cavity 21. Thus, by ensuring that the temperature ($T_C$) of the helium gas exiting demoisturizer module 380 is low enough so that it corresponds to a vapor pressure equal to or lower than the desired vapor pressure ($vP_D$), in this case 3 Torrs, the desired vapor pressure ($vP_D$) can be achieved in cavity 21 so long as a sufficient amount of the dry helium gas is flowed through cavity 21. Thus, so long as the desired dryness is known in terms of vapor pressure, a user of system 300 can calculate $T_C$ using FIG. 4 or a similar graph to achieve a level of dryness. Because current N.R.C. regulations require a vapor pressure of 3 Torrs or less to be achieved in the cavity 21 as a measure of dryness, $vP_D$ will be equal to 3 Torrs or less, thus completing steps 560 and 660 of FIGS. 5 and 6 respectively. As such, it can be seen from FIG. 4 that this corresponds to a $T_C$ of 21 degrees Fahrenheit or below.

Once $vP_D$ (3 Torrs) is known and $T_C$ is calculated (21 degrees Fahrenheit), the next step is determine the free volume $V_F$ that exists within cavity 21. This is done by reducing the total volume of cavity 21 by the approximate volume of the SNF rods contained therein and the volume of any other solids that may be present in cavity 21, such as honeycomb grid 23. Upon the free volume $V_F$ being determined, the user of the system will then pick a temperature $T_H$ that the dry helium gas will be heated to by auxiliary heater 350 and a flow rate R at which this heated dry helium gas will be supplied to cavity 21. Depending on the value of $V_F$ for the cavity to be dried, and the values chosen for $T_H$ and R, the heated dry helium gas will have to be flowed through the cavity for a period of time t before the cavity achieves the desired vapor pressure $vP_D$ of 3 Torrs. By simulating conditions within cavity 21 and setting hypothetical values for the variables of system 300, time t can be determined for any given set of variables by reading an appropriate graph of the data.

Referring to FIG. 7, a data graph is illustrated graphing time of gas flow through a cavity versus the resulting vapor in that cavity for a given set of simulated conditions. In generating this time-vapor pressure graph, the following conditions were assumed or chosen: (1) a $vP_D$ of 3 Torrs (which, from FIG. 4, relates to a $T_C$ of 21 degrees Fahrenheit); (2) a $V_F$ of 300 cubic feet; (3) a $T_H$ of 300 degrees Fahrenheit (which relates to a helium density ρ of about 0.032 pounds per cubic feet); (4) an R of 78.125 cubic feet per minute; (5) a cavity pressure ($P_C$) of 50 pounds per square inch; and (6) a starting vapor pressure $vP_S$ of 87 Torrs inside the cavity. As can be seen from the data plot, as the dry helium gas is allowed to flow through the cavity over time, the resulting vapor pressure within the cavity decreases. By plotting this data, it can be seen that at a time t of about 22.5 minutes, the resulting vapor pressure within cavity will be equal to the $vP_D$ of 3 Torrs. In determining time t, the clock is started after the temperature $T_C$ is reached for the helium gas exiting the demoisturizer module. The conditions of FIG. 7 were chosen for exemplary purposes only. Similar graphs can be simulated for any given set of starting conditions within the cavity and for any variables chosen by the user. Thus, the time necessary to achieve any desired $vP_D$ can be approximated for any given set of conditions without the need to intrusively measure the vapor pressure within the cavity. Proper graphs can be created by either properly programmed computer simulations or by graphing actual experimental data.

Alternatively, R can be chosen to be mass flow rate. Mass flow rates are easily interchangeable with volumetric flow rates by simply knowing the density of the gas flow. Mass flow rate of gas is equal to the volumetric flow rate of that gas multiplied by the gas density. For example, the volumetric flow rate R chosen above, 78.125 cubic feet per minute, corresponds to a mass flow rate of 2.5 pounds per minute, where the density of the helium is approximate to be 0.032 pounds per cubic feet. Thus, data plots similar to FIG. 7 can be simulated for given mass flow rates.

Moreover, any single variable can be calculated by setting the remaining variables. For example if a certain drying time t is desired, a graph plotting resulting vapor pressure versus gas flow rate R can be created, wherein time t is held constant and the flow rate R is varied. Thus, the present invention is not limited to a situation where any specific variable is held constant.

Referring to FIG. 8, a data graph is illustrated graphing the number of turnovers (X) of the free volume ($V_C$) time with a gas versus the resulting vapor in the cavity, for a given set of simulated conditions. In generating this turnover number-vapor pressure graph, the following conditions were assumed or chosen: (1) a $vP_D$ of 3 Torrs (which, from FIG. 4, relates to a $T_C$ of 21 degrees Fahrenheit); (2) a $V_F$ of 300 cubic feet; (3) a $T_H$ of 300 degrees Fahrenheit (which relates to a helium density ρ of about 0.032 pounds per cubic feet); (4) a cavity pressure ($P_C$) of 50 pounds per square inch; and (5) a starting vapor pressure $vP_S$ of 87 Torrs inside the cavity. As system 300 is continually operated for any given canister, the total volume of gas ($V_{tot}$) flowed into the free volume $V_F$ of the cavity increases. Because X is equal to $V_{tot}$ divided by $V_F$, X also increases as the helium gas flow continues. It can be seen from FIG. 8 that as X increases, the resulting vapor pressure decreases along the Vapor Pressure Plot line. From this data plot line, one can determine the X at which the resulting vapor pressure inside the cavity will be equal to or less than the desired vapor pressure $vP_D$ of 3 Torrs.

Turning to FIG. 9, it can be seen that when enough volume of heated dry helium gas is flowed through the cavity so that an X equal to or greater than 5.86 results, the desired vapor pressure ($vP_D$) of 3 Torrs is achieved within the cavity. Thus, by programming system 300 to achieve an X equal to 5.86 or greater, it can be ensured that the desired vapor pressure $vP_D$ of 3 Torrs is achieved in the cavity without the need to intrusively measure the interior of the cavity. The conditions of FIGS. 8 and 9 were chosen for exemplary purposes only. Similar graphs can be simulated (or plotted using actual experimental data) for any given set of starting conditions within the cavity and for any variables desired or chosen by the user, without departing from the spirit of the invention.

What is claimed is:

1. A method of drying a cavity loaded with radioactive elements, the loaded cavity having a free volume ($V_F$), a starting vapor pressure ($vP_S$), and a cavity pressure ($P_C$), the method comprising:
    determining a desired degree of dryness in the cavity in terms of a desired vapor pressure ($vP_D$);
    cooling a non-reactive gas to a temperature ($T_C$) thereby drying the non-reactive gas;
    introducing the dry non-reactive gas at a flow rate (R) into the cavity for a period of time (t); and
    removing wet non-reactive gas from the cavity;
    wherein $T_C$ and R are controlled to achieve the desired vapor pressure ($vP_D$) in the cavity after time t.

2. The method of claim 1 wherein the flow rate R is volumetric flow rate or a mass flow rate.

3. The method of claim 1 further comprising heating the dry non-reactive gas to a temperature ($T_H$) after the cooling step and prior to the introduction step, wherein $T_H$ is controlled to achieve the desired vapor pressure vPD in the cavity after time t.

4. The method of claim 3 wherein when $vP_D$ is about 3 Torrs, $V_F$ is about 300 cubic feet, $P_C$ is about 50 pounds per square inch, and $vP_S$ is about 87 Torrs; and wherein R is a volumetric flow rate set at about 78.125 cubic feet per minute, $T_H$ is set at about 300 degrees Fahrenheit, and $T_C$ is set at or below about 21 degrees Fahrenheit; time t is about 22.5 minutes.

5. The method of claim 3 wherein the non-reactive gas is helium and when $vP_D$ is about 3 Torrs, $V_F$ is about 300 cubic feet, $P_C$ is about 50 pounds per square inch, and $vP_S$ is about 87 Torrs; and wherein R is a mass flow rate set at about 2.5 pounds per minute, $T_H$ is set at about 300 degrees Fahrenheit, and $T_C$ is set at or below about 21 degrees Fahrenheit; time t is about 22.5 minutes.

6. The method of claim 1 wherein the cooling step comprises flowing the non-reactive gas through a condenser and then flowing the non-reactive gas through a demoisturizer module that freeze dries the non-reactive gas, wherein the demoisturizer module is adapted to exit the non-reactive gas at temperature $T_C$.

7. The method of claim 1 further comprising re-circulating the wet non-reactive gas removed from the cavity by subjecting the removed wet non-reactive gas to the cooling step.

8. The method of claim 1 further comprising:
ceasing the introduction of the dry non-reactive gas into the cavity after time t has passed; and
sealing the cavity thereby forming an atmosphere of dry non-reactive gas within the cavity, the cavity having a vapor pressure at or below $vP_D$.

9. The method of claim 1 wherein the non-reactive gas is nitrogen, carbon dioxide, light hydrocarbon gases, or an inert gas selected from the group consisting of helium, argon, krypton and xenon.

10. The method of claim 1 wherein the desired vapor pressure $vP_D$ in the cavity is at or below about 3 Torrs.

11. The method of claim 1 wherein the temperature $T_C$ is at or below about 21 degrees Fahrenheit.

12. A method of drying a cavity loaded with radioactive elements, the loaded cavity having a free volume ($V_F$), a starting vapor pressure ($vP_S$), and a cavity pressure ($P_C$), the method comprising:
determining a desired degree of dryness in the cavity in terms of a desired vapor pressure ($vP_D$);
cooling a non-reactive gas to a temperature ($T_C$) thereby drying the non-reactive gas;
introducing the dry non-reactive gas into the cavity so that the free volume $V_F$ of the cavity turns over X times; and
removing wet non-reactive gas from the cavity;
wherein $T_C$ and X are controlled to achieve the desired vapor pressure ($vP_D$) in the cavity.

13. The method of claim 12 further comprising heating the dry non-reactive gas to a temperature ($T_H$) after the cooling step and prior to the introduction step, wherein $T_H$ is controlled to achieve the desired vapor pressure $vP_D$.

14. The method of claim 13 wherein when $vP_D$ is about 3 Torrs, $V_F$ is about 300 cubic feet, $P_C$ is about 50 pounds per square inch, and $vP_S$ is about 87 Torrs; and wherein $T_H$ is set at about 300 degrees Fahrenheit, and $T_C$ is set at or below about 21 degrees Fahrenheit; X is about 5.85.

15. The method of claim 12 wherein the cooling step comprises flowing the non-reactive gas through a condenser module and then flowing the non-reactive gas through a den-moisturizer module that freeze dries the non-reactive gas, wherein the demoisturizer module is adapted to exit the non-reactive gas at the temperature $T_C$.

16. The method of claim 12 further comprising re-circulating the wet non-reactive gas removed from the cavity by subjecting the removed wet non-reactive gas to the cooling step.

17. The method of claim 12 further comprising:
ceasing the introduction of the dry non-reactive gas into the cavity after the free volume $V_F$ of the cavity is turned-over X times; and
sealing the cavity thereby forming an atmosphere of dry non-reactive gas within the cavity, the cavity having a vapor pressure at or below $vP_D$.

18. The method of claim 12 wherein the non-reactive gas is nitrogen, carbon dioxide, light hydrocarbon gases, or an inert gas selected from the group consisting of helium, argon, krypton and xenon.

19. The method of claim 12 wherein the desired vapor pressure $vP_D$ is at or below about 3 Torrs.

20. The method of claim 12 wherein the temperature $T_C$ is at or below about 21 degrees Fahrenheit.

21. The method of claim 1 wherein the cavity is formed by a canister and the radioactive elements are spent nuclear fuel rods.

22. The method of claim 21 wherein the canister is positioned within a radiation shielding cask in a vertical orientation during the steps of introducing the dry non-reactive gas and removing the wet non-reactive gas.

23. The method of claim 22 further comprising:
ceasing the introduction of the dry non-reactive gas into the cavity after time t has passed; and
hermetically sealing the cavity thereby forming an atmosphere of dry non-reactive gas within the cavity, the cavity having a vapor pressure at or below $vP_D$.

24. The method of claim 12 wherein the cavity is formed by a canister and the radioactive elements are spent nuclear fuel rods.

25. The method of claim 24 wherein the canister is positioned within a radiation shielding cask in a vertical orientation during the steps of introducing the dry non-reactive gas and removing the wet non-reactive gas.

26. The method of claim 25 further comprising:
ceasing the introduction of the dry non-reactive gas into the cavity after the free volume $V_F$ of the cavity is turned-over X times; and
hermetically sealing the cavity thereby forming an atmosphere of dry non-reactive gas within the cavity, the cavity having a vapor pressure at or below $vP_D$.

* * * * *

UNITED STATES PATENT AND TRADEMARK OFFICE
CERTIFICATE OF CORRECTION

PATENT NO. : 7,096,600 B2 Page 1 of 1
APPLICATION NO. : 10/318657
DATED : August 29, 2006
INVENTOR(S) : Krishna P. Singh It is certified that error appears in the above-identified patent and that said Letters Patent is hereby corrected as shown below:

Column 14

In line 11, before "the cavity thereby forming", please delete "scaling"

In line 11, before "the cavity thereby forming", please insert -- sealing --

Signed and Sealed this

Sixth Day of February, 2007

JON W. DUDAS
*Director of the United States Patent and Trademark Office*